UNITED STATES PATENT OFFICE.

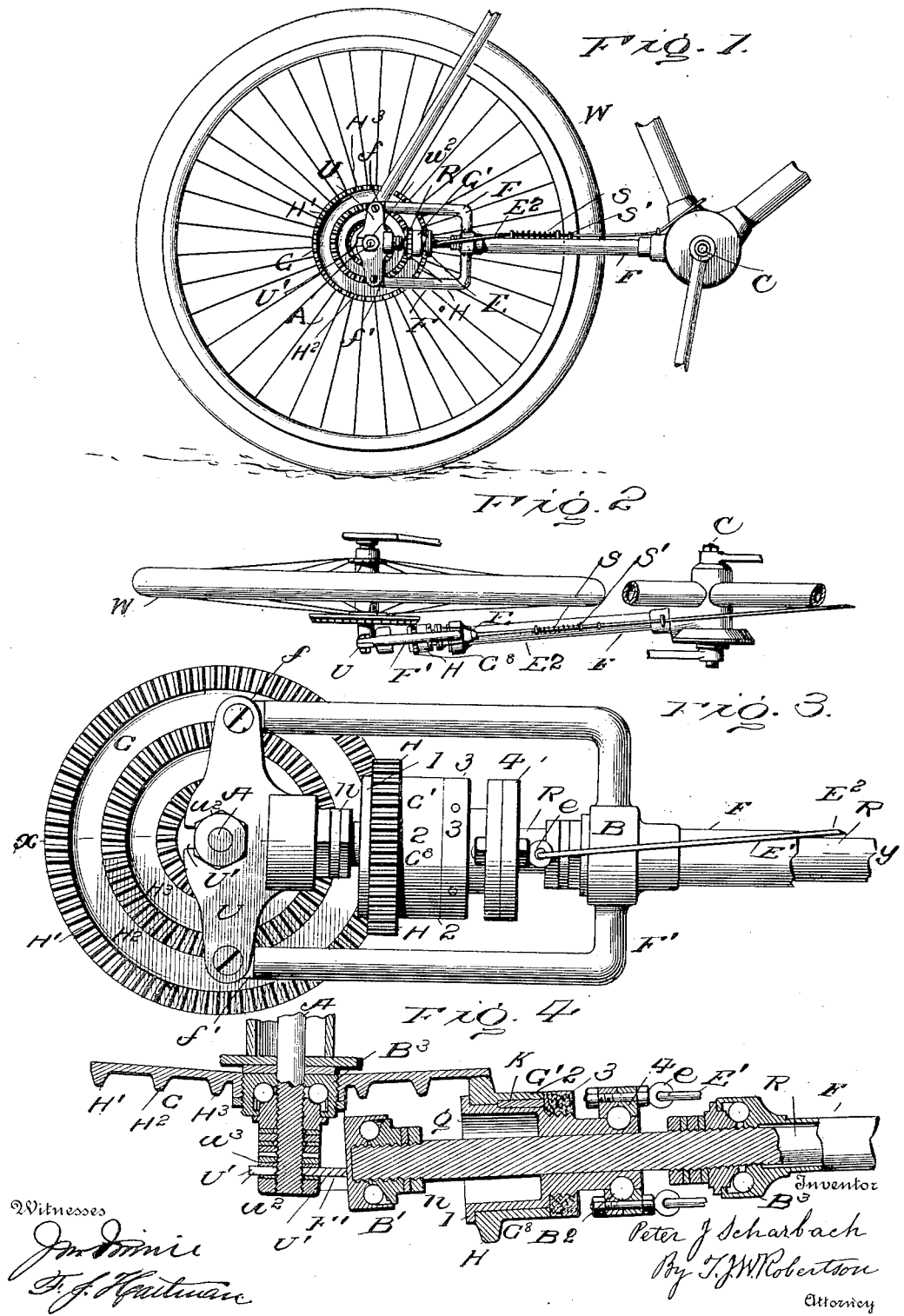

PETER J. SCHARBACH, OF WOODBURN, OREGON, ASSIGNOR, BY DIRECT AND MESNE ASSIGNMENTS, OF THREE-FOURTHS TO THOMAS SIMS, OF SALEM, OREGON.

GEAR FOR BICYCLES.

SPECIFICATION forming part of Letters Patent No. 649,878, dated May 15, 1900.

Application filed April 25, 1899. Serial No. 714,434. (No model.)

*To all whom it may concern:*

Be it known that I, PETER J. SCHARBACH, a citizen of the United States, residing at Woodburn, in the county of Marion, State of Oregon, have invented a certain new and useful Improvement in Changeable Gears for Chainless Bicycles, of which the following is a specification, reference being had to the accompanying drawings.

This invention relates to improvements in changeable gears on chainless bicycles in which the bevel-gearing on the rear wheel of a chainless bicycle as now in use is replaced by an adjustable changeable gear, whereby the climbing of steeper grades is facilitated. I attain these objects by the mechanism illustrated in the accompanying drawings, in which—

Figure 1 is a side view of the rear wheel of a chainless bicycle, showing the changeable gear in place. Fig. 2 is a top view of the same. Fig. 3 is a side view of the changeable gear on a larger scale. Fig. 4 is a horizontal cross-section through the same at line $x\,y$.

Similar letters and numerals refer to similar parts throughout the several views.

The power is applied to the gear-shaft R, housed in tube F, by the ordinary bevel-gear on pedal crank-shaft C and is transferred by sliding gear G', sliding on gear-shaft R, to the gear-disk G, which is fastened to the axle A of the rear wheel W. Tube T is formed at its end into a fork F', through the center of which the gear-shaft R passes and revolves in the ball-bearings B and B'. The ends $f\,f'$ of the fork F are held in place by clamp U, which again is slid onto the outer end of the axle A of wheel W by its notched-out part U' and adjustably secured to said axle by nuts $u^2$ and $u^3$. In the fork F' and on the gear-shaft R slides the round sliding gear $G^3$, which has a cog-gearing ring H around its outer end and connects therewith with the different cog-gears H', $H^2$, and $H^3$, with which gear-disk G is provided. The gear-disk G is secured to axle A of the rear wheel W by the ball-bearing $B^3$, with its cone. The gear-clutch $G^3$, which is adjustable, slides on the gear-shaft R in the fork F. The sliding gear G' is hollowed out at its end at $g$, so as to slip over the ball-bearing B, with its cone C and jam-nut $n$. This sliding gear G' consists of the body-piece 1 and the gear-piece 2, and to prevent these pieces 1 and 2 from turning separately a key K is inserted between the pieces 1 and 2 and kept in its place by the jam-nut 3, screwed unto the body-piece 1. The body-piece 1 has at the end toward the crank-shaft C a ball-bearing $B^2$, to the casing 4 of which two eyebolts E are secured, whereby the sliding gear G' can be adjusted by sliding back and forward on gear-shaft R. The clevis E' is fastened to these eyebolts E and terminates into a rod $E^2$, passing through a spiral spring S, located between a lug S', projecting from the tube T, and a washer or equivalent device secured to the said rod $E^2$. This rod $E^2$ is to be operated by the rider when a change in the gear is desired, and if released by the rider the sliding gear G' will jump back through the means of pressure of spring S into its original position. When a change in the gearing is desired, the sliding gear G' is slid along the gear-shaft R until the cog-gearing H connects itself with the suitable gear $H^2$ or $H^3$ on the face of the gear-disk G. This gear-disk G, being held in place by ball-bearing $B^3$, is distanced just far enough from the sliding gear G' to allow the respective gearings to enter each other easily. For this purpose the face of gear-disk G is dished in or convexed, so that said face is parallel to the center line of gear-shaft R. The gear-disk G can be enlarged and provided with as many cog-gearings as may be suitable.

I am aware that prior to my invention changeable gearing has been in use. I therefore do not claim such a combination broadly; but What I do claim as my invention, and desire to secure by Letters Patent, is—

1. The combination in a changeable gear for cycles, of a gear-disk having a plurality of gears thereon, a gear-shaft, a bearing for said shaft, a sliding gear arranged to mesh with the gears on said disk, and having a hollow end, and means for moving said gear on its shaft, the hollow end of the gear passing over said bearing as it nears the end of its movement, substantially as described.

2. The combination in a changeable gear for cycles and with the rear wheel thereof having a gear-disk provided with a plurality of gears thereon, of a clamp supported by the rear axle, a bearing supported by said clamp, a tube extending rearwardly from the crank-hanger, a gear-shaft rotating in said tube, and on the aforesaid bearing, a sliding gear arranged to mesh with any of the gears on said gear-disk and having its rear end made hollow, and means for moving said gear on its shaft, the said hollow end of the gear passing over the said bearing when it is moved rearwardly on its shaft, substantially as described.

3. The combination in a changeable gear for cycles and with the rear wheel thereof having a gear-disk provided with a plurality of gears thereon, of a clamp U secured to the rear axle and having outwardly-projecting ends $f$, $f'$, forked tubing F having its forked members connected with the projecting ends of said clamp, a tube T connecting the other end of said forked tubing with the crank-hanger, a bearing supported on said clamp, and a bearing supported at the juncture of said forked tubing and the tube T, a gear-shaft R rotating in said tube T and supported on said bearings, a gear sliding on said shaft R between said bearings and arranged to mesh with any of the plurality of gears on the said gear-disk, and means for sliding the gear-disk on its shaft comprising a casing 4 having ball-bearings 2 between it and the said gear, a clevis E' secured to said casing, and a rod $E^2$, substantially as and for the purpose specified.

4. The combination in a changeable gear for cycles and with the rear wheel thereof having a gear-disk G provided with a plurality of cog-gears thereon, of a clamp U secured to the rear axle and having outwardly-projecting ends $f$ $f'$, a forked-out tubing F having its forked members connected with the ends of said clamp U, a tube T connecting the front end of said forked-out tubing with the crank-hanger, and ball-bearings connected with said clamp U within the forked-out tubing F, a shaft R rotating within said tube T and having its rear end running on said ball-bearings, a gear sliding on said shaft R, arranged to mesh with any of the gears on said gear-disk G, and having its rear end hollow to allow it to slide over the aforesaid ball-bearing, the other end of said sliding gear having a ball-bearing connection with the casing 4, a clevis E' connected with said casing, a rod $E^2$ connected with said clevis and a spring S operating on said rod $E^2$ to move the gear-clutch in one direction, substantially as and for the purpose specified.

In testimony whereof I affix my signature, in the presence of two witnesses, this 15th day of April, 1899.

PETER J. SCHARBACH.

Witnesses:
A. OHLHOFF,
FRED TOPKEN.